US005911945A

United States Patent [19]

Fasano et al.

[11] Patent Number: 5,911,945

[45] Date of Patent: Jun. 15, 1999

[54] METHOD FOR IN-SITU ENVIRONMENT SENSITIVE SEALING AND/OR PRODUCT CONTROLLING

[75] Inventors: Benjamin Vito Fasano, New Windsor; Johnathan Stephen Fish, Watervliet; Gregory M. Johnson, Poughkeepsie; Subhash Laxman Shinde, Croton-on-Hudson, all of N.Y.

[73] Assignee: International Business Machines Corporation, Armonk, N.Y.

[21] Appl. No.: 08/923,696

[22] Filed: Sep. 4, 1997

Related U.S. Application Data

[62] Division of application No. 08/683,923, Jul. 19, 1996, Pat. No. 5,753,162, which is a division of application No. 08/451,933, May 26, 1995, Pat. No. 5,628,849.

[51] Int. Cl.$^{6}$ .................................................... B29D 22/00

[52] U.S. Cl. .......................... 264/653; 264/365; 264/662; 264/666; 264/652; 423/364; 423/345; 501/96; 501/97

[58] Field of Search .................................... 423/344, 345; 264/66, 65, 652, 660, 686, 602, 666, 653, 107, 673, 345; 501/96, 98, 97

[56] References Cited

U.S. PATENT DOCUMENTS

| | | | |
|---|---|---|---|
| 4,259,061 | 3/1981 | Dubetsky | 432/13 |
| 4,340,436 | 7/1982 | Dubetsky et al. | 156/89 |
| 5,094,986 | 3/1992 | Matsumoto et al. | 501/97 |
| 5,130,067 | 7/1992 | Flaitz et al. | 264/60 |
| 5,219,500 | 6/1993 | Yoshida et al. | 264/65 |
| 5,364,608 | 11/1994 | Edler | 423/344 |
| 5,376,601 | 12/1994 | Okawa et al. | 501/98 |

*Primary Examiner*—Merrick Dixon
*Attorney, Agent, or Firm*—Aziz M. Ahsan

[57] ABSTRACT

A single furnace loading cycle method for sintering at least one product comprises placing at least one product into a ventable/sealable box, and placing the box within the furnace. The box is vented inside the furnace at a first temperature range and the product is sealed inside the box in a second temperature range, wherein the second temperature range is higher than the first temperature range. The box includes a closeable top cover and a control means that comprises a first set of collapsible spacers which hold open the cover at temperatures below the first temperature range and collapse to lower the cover into sealing engagement with the box at temperatures above the first temperature range. The box further comprises a substrate to be sintered with a lower and an upper setter on opposite sides of the substrate. The substrate rests on the lower setter, and a second set of collapsible spacers rest on the lower setter and have heights sufficient to lift the upper setter above the height of the substrate, and wherein the second set of spacers collapse to lower the upper setter to rest upon the substrate at temperatures above the first temperature range.

18 Claims, 3 Drawing Sheets

METHOD FOR IN-SITU ENVIRONMENT SENSITIVE SEALING AND/OR PRODUCT CONTROLLING

CROSS-REFERENCE TO A RELATED PATENT APPLICATION

This patent application is a divisional patent application of U.S. patent application Ser. No. 08/683,923, filed Apr. 19, 1996 which issued on May 19, 1998, as U.S. Pat. No. 5,753,162, and which was a divisional patent application of U.S. patent application Ser. No. 08/451,933, filed May 26, 1995 which issued on May 13, 1997, as U.S. Pat. No. 5,628,849.

This patent application is related to U.S. patent application Ser. No. 08/451,899, entitled "APPARATUS FOR IN-SITU ENVIRONMENT SENSITIVE SEALING AND/OR PRODUCT CONTROLLING", filed on May 26, 1995, assigned to the assignee of the instant patent application, and the disclosure of which is incorporated herein by reference.

FIELD OF THE INVENTION

The present invention relates generally to a new apparatus and method for in-situ processing of a product in an open atmosphere and then in-situ placing the product in a closed box in a second environment. More particularly, the invention encompasses an apparatus and a method that allows the binder to burn out of products, such as, substrates and then without taking the substrates out of the furnace to be able to sinter the substrates within the furnace in a closed atmosphere. The invention also generally relates to the fabrication of fired substrates and, more particularly, to the binder burn out and sintering of such substrates. Also disclosed is the in-situ application of weight on the product at the desired temperature due to the deformation or collapse of a sensitive spacer.

BACKGROUND OF THE INVENTION

Ceramic substrates are of particular importance in the microelectronics industry for the mounting, packaging and cooling of integrated devices. The fabrication of ceramic substrates is well known and is described, for example, in U.S. Pat. No. 5,130,067 issued to Philip L. Flaitz et al. on Jul. 14, 1992 and assigned to the present assignee. Burn-out and sintering comprise the final steps in the fabrication sequence. Burn-out drives off the volatile binder utilized in the ceramic slurry into a vented atmosphere. It is well known to be beneficial to apply weight to the ceramic substrate during sintering to minimize distortion due to shrinkage and cambering of the substrate.

Provision has been made in the prior art cited in the Flaitz et al patent, namely, U.S. Pat. No. 4,340,436 issued to Dubetsky et al on Jul. 20, 1982 and assigned to the present assignee, to accomplish burn out and sintering in a two step process. In the first step, the substrates are loaded into a furnace held at a temperature range and for a time sufficient to drive off the binder, cooled to room temperature, and then unloaded. The same substrates are placed into a configuration to maintain substrate flatness and then reloaded into a furnace and exposed to a higher temperature range and a longer time than were employed in the previous burn out cycle.

U.S. Pat. No. 5,130,067, cited above, teaches a process of applying an external load during sintering of a green ceramic substrate to constrain the substrate in the and Y directions and thereby control dimensional stability. The load is applied by weights that are either in place at the start of the heating cycle or remotely applied to the substrate by pneumatic, hydraulic or mechanical levers.

U.S. Pat. No. 4,259,061 issued to Derry J. Dubetsky on Mar. 31, 1981 and assigned to the present assignee describes the use of ceramic coated refractory plates used for setters onto which alumina substrates are placed to control shrinkage uniformly.

U.S. Pat. No. 5,364,608 issued to James P. Edler on Nov. 15, 1994 discloses a method to form sintered silicon nitride articles within a walled container which is vented to the furnace in which it is placed.

U.S. Pat. No. 5,376,601 issued to Yoshihiro Okawa on Dec. 27, 1994 cites the components used in the sintering of AlN components that resist deformation at high temperatures. When the sintered AlN product itself is used as setters and supports for a baking jig to hold other AlN products to be sintered, the patent states that the setters and supports of the jig are not deformed under the baking conditions and, hence, do not cause the molded articles to be deformed.

The following Japanese Patent Publications show the use of refractory boxes for sintering aluminum nitride substrates placed therein.

| Publication No. | Publication Date | Inventor |
|---|---|---|
| 02-302088 | December 14, 1990 | Omote Koji et al. |
| 03-097682 | April 23, 1991 | U. Etsuro et al. |
| 04-198062 | July 17, 1992 | H. Michio et al. |
| 05-009076 | January 19, 1993 | T. Yutaka et al. |
| 05-105526 | April 27, 1993 | Akiyama Susumu |

This invention overcomes the above-mentioned problems and short-comings of the prior art, and provides a refractory box that remains open during a first temperature range, such as, during binder burn out, and automatically in-situ seals itself during a second temperature range, such as during the sintering cycle. It further provides a method to apply a weight onto a substrate at a predetermined temperature within the box.

PURPOSES AND SUMMARY OF THE INVENTION

The invention is a novel method and an apparatus for in-situ sealing to provide open atmosphere binder burn out and closed atmosphere sintering.

Therefore, one purpose of this invention is to provide an apparatus and a method that will provide a vented atmosphere binder burn out and sealed atmosphere sintering with a single furnace loading of components to be sintered.

Another purpose of this invention is to provide a refractory box for holding components to be sintered therein, said box permitting maximum binder removal rate at one time and automatically preventing rapid evaporation of transient liquid sintering aid at a later time in the sintering cycle.

Still another purpose of this invention is to provide a refractory box for holding components to be sintered therein, said box being vented during a first phase of the sintering cycle and being sealed automatically during a second phase of the sintering cycle.

Yet another purpose of this invention is to provide an automatic means located entirely within a refractory holding components to be sintered therein whereby weight is applied to said components only after a selected phase of the sintering cycle.

These and other purposes of the present invention are achieved in a best mode embodiment by the provision of a refractory box which is vented initially to the surrounding atmosphere of a sintering furnace. The box later seals itself from said atmosphere upon the attainment of a predetermined sintering temperature. Stacked setters within the box support the ceramic components to be sintered. The successive setters initially are spaced from each other by an amount greater than the thickness of said components. Said spacing is reduced at the aforesaid temperature so that the weight of an overlying setter thus is applied uniformly to the underlying ceramic components to help control camber and dimensional stability during sintering. Temperature sensitive collapsible spacers are used to change the venting and the weight pressure that is applied on top of the components.

Therefore, in one aspect this invention comprises a refractory box having at least one in-situ closeable cover comprising; a frame, a first cover and a second cover, wherein said first cover and said second cover sandwich said frame, and at least one control means connects at least a portion of said frame to at least a portion of at least one of said covers, and wherein said control means deforms at a predictable temperature in a thermal environment and thereby forms said refractory box having at least one in-situ closeable cover.

In another aspect this invention comprises a method for heating a product in a thermal environment with in-situ closeable cover comprising the steps of:

(a) placing said product in a box, wherein said box has a first cover a frame and a second cover, (b) separating said first cover from said frame with at least one sensitive spacer, (c) placing said box in said thermal environment, and wherein said sensitive spacer deforms at a predictable temperature and reduces the distance between said first cover and said frame.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the drawings. The invention itself, however, both as to organization and method of operation, may best be understood by reference to the detailed description which follows taken in conjunction with the accompanying drawings in which:

DETAILED DESCRIPTION OF THE INVENTION

In the sintering of metallized ceramic substrates, it has been found that ideally the substrate initially should be fully exposed to the furnace atmosphere during the binder burn-out (BBO) phase to allow maximum binder removal rates. Thereafter, it may be desired to apply weight onto the substrate to minimize distortion. In some applications which use a transient liquid phase sintering aid or where the substrate to be heated has components with high vapor pressure which are to be retained within the substrate, the substrate may need additional processing with the enclosed container. These desiderata are currently practiced as a two step process that extends the overall cycle time considerably, as well as requiring the loading and unloading of the furnace twice.

In accordance with the present invention, an in situ box sealing technique is provided which uses fusible or collapsible or deformable spacers that allow for the venting of BBO products but deform or collapse at higher temperatures to close a lid on the box to retain volatile species during the subsequent sintering cycle after binder burn-out has been completed.

AlN, for example, typically is sintered at high temperatures using volatile sintering aids to produce the highest thermal conductivity. Compositions have -been developed that sinter to high thermal conductivities at less than 1700° C. using various combinations of Al, B, Ca, F, Y, etc. These compositions all require processing using a binder which must be removed slowly during the BBO phase. This is accomplished in the above-mentioned two step process by first loading the substrates into a furnace for a BBO cycle exposed to furnace ambient at between about 1200 to about 1300° C. for a few hours, cooling to room temperature and then unloading the substrates. The same substrates are then reloaded in a stack sinter configuration to maintain flatness between the setter tiles, such as, Mo setter tiles, and sintered at about 1625° C. while sealed from the furnace ambient for more than 10 hours in a sealed refractory box. Without using the box the substrate only sinters to about 80 percent of theoretical density. With the sealed box about 98 to 99 percent of theoretical density can be obtained.

Figure 1:
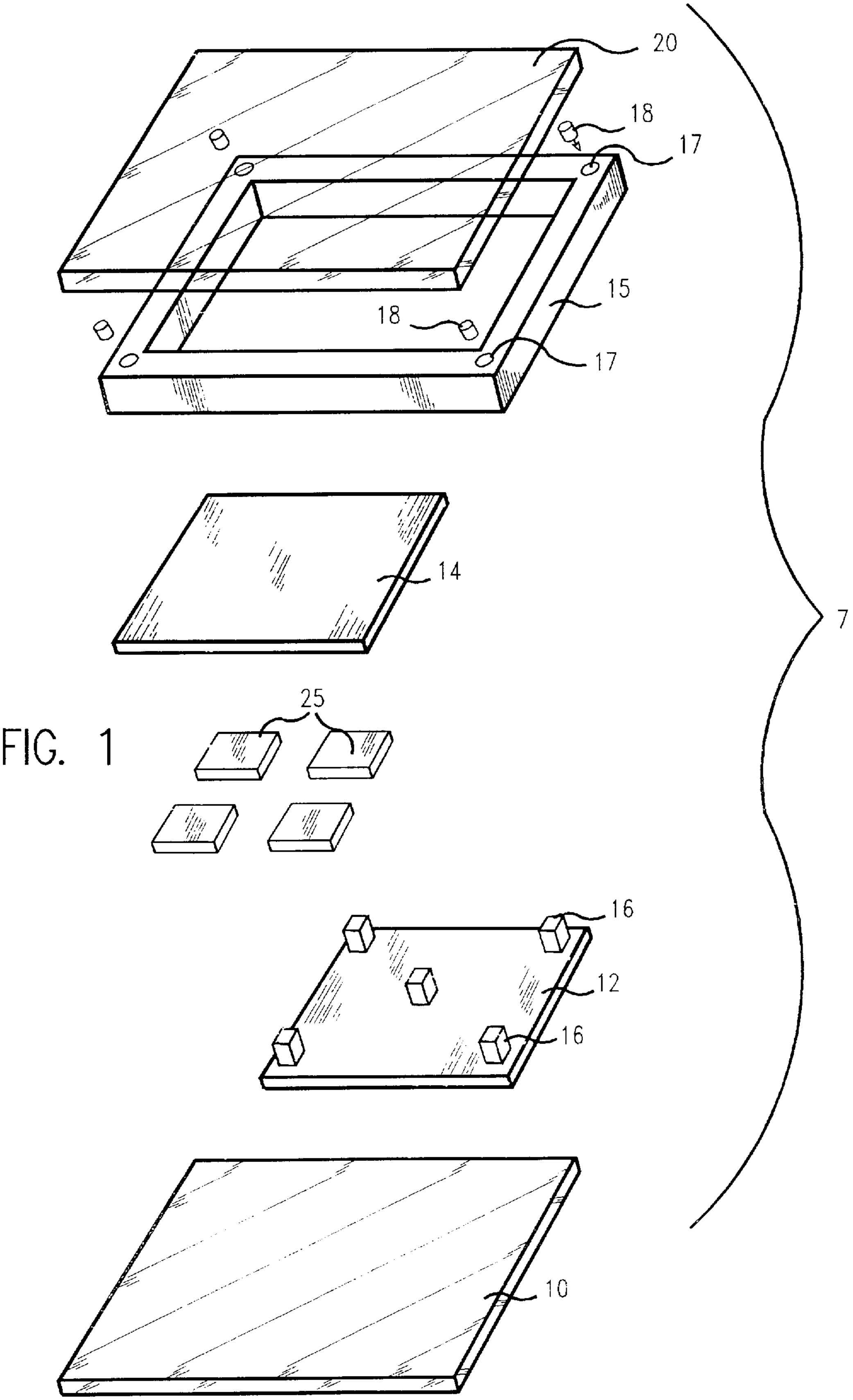
FIG. 1, illustrates a preferred embodiment of this invention, which is a simplified exploded view of the best mode embodiment of the refractory box and the contents thereof in accordance with the present invention.
Figure 2:
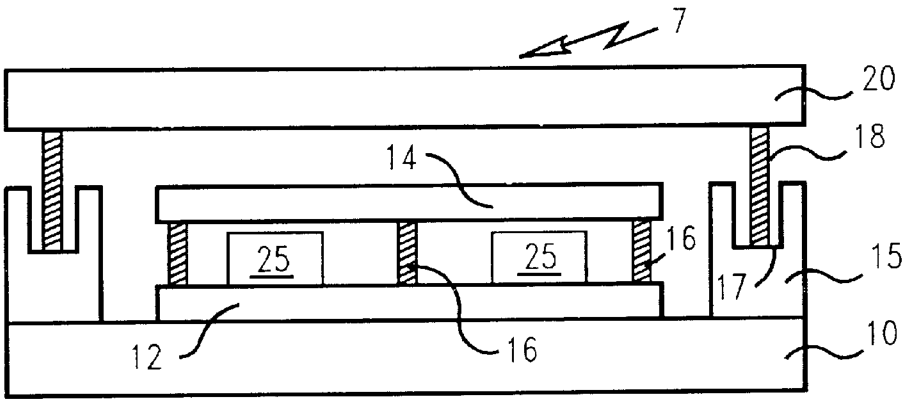
FIG. 2, illustrates a cross-sectional view of the assembled refractory box of FIG. 1.

However, with this invention the BBO and sintering steps are combined into one furnace loading cycle using the inventive box configuration shown in FIG. 1, and wherein FIG. 2, illustrates a cross-sectional view of the assembled inventive box of FIG. 1. Products 25, such as, substrates 25, are placed on a first or lower setter tile 12. A second or upper setter tile 14, is then placed over the lower setter tile 12, and is raised sufficiently above the substrates 25, by fusible or deformable or collapsible or sensitive spacers 16, to allow for minimally impeded BBO gas evolution.

At the required time/temperature schedule, sensitive spacers 16, collapse to allow the upper setter tile 14, to drop onto underlying substrates 25. The dropping of the setter tile 14, onto the substrate 25, could be gradual or sudden depending upon the material characteristics of the sensitive spacer 16. The upper setter tile 14, can now be used to apply a uniform load on the substrate 25, such as, for example, to help in controlling the camber and dimensional stability of the underlying substrate 25.

A second set of fusible or deformable or collapsible or sensitive spacers 18, which could be made from material similar to the spacers 16, are provided to initially hold up the top cover 20, for sealable refractory box 7. Spacers 18, are preferably mounted in recesses 17, in frame 15. Base 10, is secured to frame 15, by methods well known in the art. Spacers 18, are tall enough to raise top cover 20, above the frame 15, during the BBO cycle so that the volatilized binder within the substrates 25, may vent into the furnace atmosphere. As earlier stated, however, spacers 18, collapse when the furnace temperature is raised to begin the sintering cycle to allow the top cover 20, to lower and seal itself to the frame 15, thereby retaining the volatile sintering aids within the sealable refractory box 7. It has been found that sealing of the box 7, is important for achieving high density and thermal conductivity. Cover 20, should be thick enough to remain flat during temperature processing and to provide a good seal to the box 7, after spacers 18, have collapsed.

Figure 3:
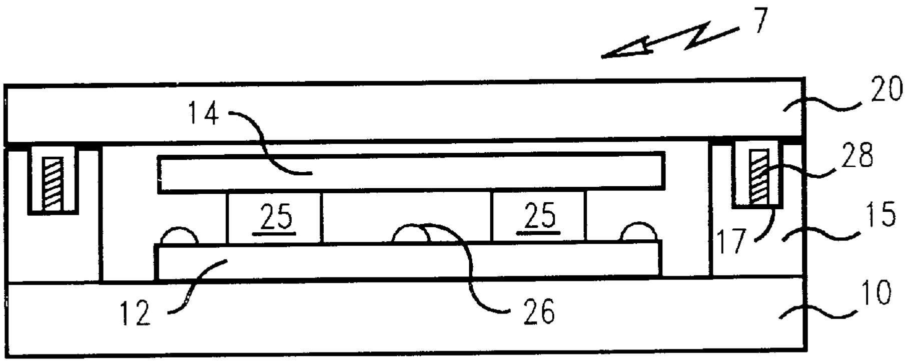
FIG. 3, illustrates a cross-sectional view after the refractory box of this invention has gone through binder burn out and is in the sintering cycle in a furnace.

FIG. 3, illustrates a cross-sectional view after the inventive box 7, of this invention has gone through binder burn out and is in the sintering cycle in a furnace. As can be clearly seen that the spacer 16, has either fused or collapsed or evaporated and has left behind residual material 26. The residual material 26, could be in a liquid state or could be in a shape of a shrunk slug. Similarly, the spacer 18, has also either fused or collapsed or evaporated and has left behind residual material 28, within the cavity 17. The residual material 28, could be in a liquid state or could be in a shape of a shrunk slug. As stated earlier that once the spacer 16, collapses the upper setter tile 14, drops and applies pressure onto the substrates 25. While, upon the collapse of the spacer 18, the cover 20, provides a good seal for the box 7, and prevents the volatile material inside the box 7, from escaping into the furnace.

Figure 4:
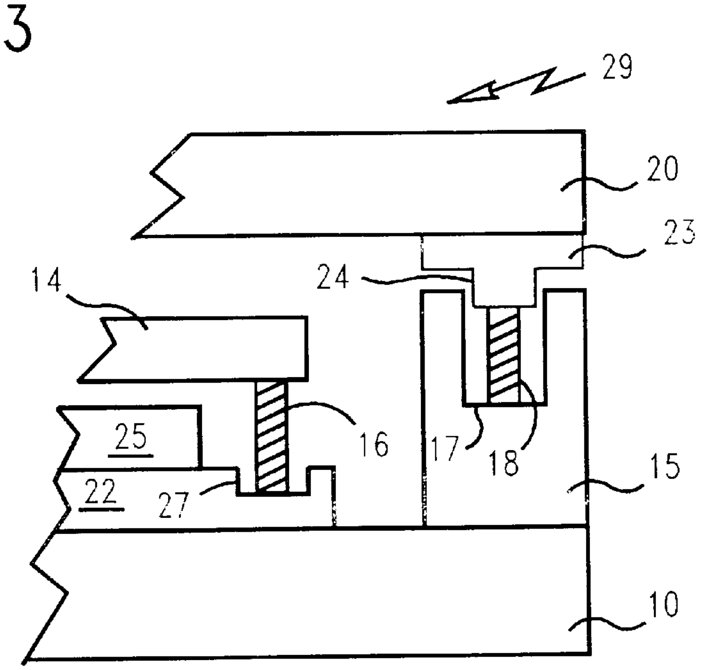
FIG. 4, illustrates another preferred embodiment of this invention, which is a simplified cross-sectional view of an optional implementation of the refractory box of FIG. 1.

An alternative embodiment of this invention is to use the spacer materials which may be allowed to melt into a liquid form in order to achieve very specific collapse temperatures is shown in FIG. 4. In this embodiment the inventive box 29, has a hollowed-out support pit or blind hole or cavity 17 and 27, made in the frame 15, and the first or lower setter tile 22, respectively. The spacers 16 and 18, are then mounted in the blind hole 27 and 17, respectively, so that the molten material from the spacers 16 and 18, respectively, is collected inside the cavities 27 and 17, respectively, and is not free to spill about in the furnace.

In order to ensure that the material from the spacer is contained within the inventive box of this invention a piston having a stop could be provided. One such piston 23, having a stop 24, is shown in FIG. 4, which forces the material from the collapsing spacer 18, to stay inside the cavity 17. A similar piston with a stop could also be provided for the spacer 16, so that the material from the collapsing spacer 16, could be forced to stay inside the cavity 27. Of course the piston 23, having the stop 24, could be integrated and made a part of the cover 20. Similarly, a piston having the stop could be integrated and made a part of the upper or second setter tile 14.

Figure 5:
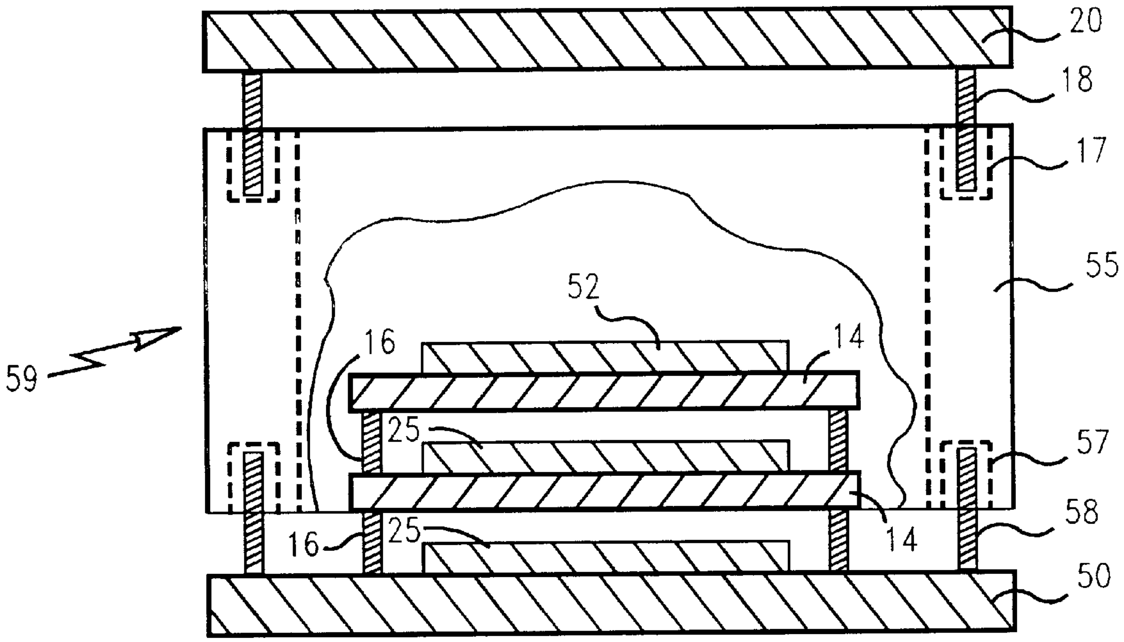
FIG. 5, illustrates another preferred embodiment of the invention where at least one collapsible spacer is on the bottom cover to hold the frame and at least one collapsible spacer is on the frame to hold the top cover, and a plurality of collapsible spacers hold a plurality of products inside the frame.

FIG. 5, illustrates another preferred embodiment of the invention where a refractory box 59, having sensitive or collapsible or deformable spacers 58, on the bottom cover 50, hold the frame 55, and sensitive spacers 18, on the frame 55, hold the top cover 20. Also, shown are a plurality of collapsible spacers 16, that hold a plurality of products 25, inside the frame 55. As can be clearly seen that once the sensitive spacers 16, collapse or deform the tile 14, comes to rest on top of the product 25, and applies weight pressure. One could also have a product 52, where a weight pressure is not desired or required and in that case it could be placed on top of the tile 14, or on top of the bottom cover 50, without the tiles 14.

It should be noted that the product 25 or 52, could be anything that needs to go through a controlled thermal environment. The range of the thermal environment could be below 0° C. to above 0° C.

Sensitive spacers 16, 18 and 58, are preferably made from ceramic, refractory metal, cermet material or other metal material. For a specific application, such as BBO, the spacers should be made from a material that can survive the BBO cycle, usually between about 1200 and about 1330° C., for about 4 hours, without any significant deformation during the heating process.

The spacers 16, 18 and 58, can also be made from the family of metals such as Mo and W which are stable in $H_2$ atmospheres or from ceramics such as $Al_2O_3$, $ZrO_2$, and AlN which can be sintered in the range of between about 1400° C. to about 1600° C. range.

The spacers 16, 18 and 58, preferably can be fabricated from a pressed, cast or extruded mixture that can be processed to form a pellet or disc shape or any other shape. Care should be taken that the materials that are selected for the spacers 16, 18 and 58, are stable, so as not to melt and react with their underlying support or have high vapor pressure that can interact with the furnace, hardware or substrate.

The material of fusible spacers 16, 18 and 58, is preferably selected based upon its shrinkage after the BBO cycle has been completed. Such shrinkage can be varied by changing the particle size of the constituent powder (finer powders sinter earlier), adding sintering aids to accelerate shrinkage (Pt, Pd activate sintering of Mo and W at less than 1200° C.) or adding sintering inhibitors such as AlN, $Al_2O_3$. Once the amount of shrinkage is determined that occurs after BBO has been completed, the composition of the material for the spacers 16, 18 and 58, can be determined to provide the proper spacer height that will shrink enough after BBO to allow the upper setter tiles 14, to drop onto the substrates 25, or to close the box lid 20, as the case may be. The spacers 16, 18 and 58, can be pre- or partially sintered to provide strength, if needed. A pressing operation appears to be the most cost efficient manufacturing method to manufacture the deformable or collapsible spacers 16, 18 and 58.

An example of shrinkage values for pressed pellets made of different starting material powder sizes is shown in Table 1. These tungsten powders were pressed into ½ inch cylinders and heated in a furnace in 10 percent hydrogen in nitrogen atmosphere at 4° C./min up to the indicated temperature and hold time.

TABLE 1

| | Height Shrinkage After | |
|---|---|---|
| Powder Type | 1300° C./4 hr | 1300° C./4 hr–1625° C./24 hr |
| WA25 | 3.0 percent | 16.0 percent |
| WA10 | 8.0 percent | 22.6 percent |
| HC40 | 16.4 Percent | 26.3 percent |

As can be clearly seen in Table 1, at least a 10 percent change in height can be obtained between the low and high temperature holds, providing an indication of the amount of the shrinkage available to allow a setter plate or cover to be lowered onto a substrate or box to provide flattening or sealing, respectively.

The rate of collapse of the sensitive spacer is gradual and is primarily controlled by the composition of the spacer material. Other factors that can also have a direct impact on the rate of collapse or sensitivity of the spacer is its processing history, such as, for example, the ambient atmosphere that it was prepared in, supported load and the heating rate to which the spacer was subjected during its manufacturing, etc.

Examples of spacer materials with a very specific collapse temperature would be those made from high purity elements or eutectic metals, including low temperature solders. Table 2, for example, provides data for low to medium temperature metals that could be used for very specific collapse temperatures.

TABLE 2

| Collapse Temperature (° C.) | Spacer Composition (percent) |
|---|---|
| −32 | 1,2 Dichloroethane |
| 30 | Phenyl Ether |
| 100 | 46 Bi, 34 Sn, 20 Pb |
| 145 | 51.2 Sn, 30.6 Pb, 18.2 Cd |
| 199 | 91 Sn, 9 Zr |
| 525 | 45 Ag, 38 Au, 17 Ge |
| 780 | 72 Ag, 28 Cu |
| 1,063 | 100 Au. |

The sensitive spacers could also be made from materials which respond to changes in atmosphere to affect a change in the shape of the spacer. For example, a reducible metal oxide powder could be prepared as a spacer which will tolerate an oxidizing or neutral atmosphere without significant collapse or change in shape. However, at the desired time in the process, for instance, after BBO in an oxidizing atmosphere, the ambient could be changed to reduce the metal oxide and cause the spacer to collapse or melt. This deformation of the sensitive spacer from one atmosphere to another could be used to actuate the motion of the cover closing onto the frame or the application of applying weight/pressure onto a product. Copper oxide, for example, undergoes about 40 volume percent reduction during reduction to a metal. Therefore, the spacers used in this invention could be selected from a group comprising of materials that are sensitive to the change in ambient oxygen partial pressure.

Another application which could utilize this invention would be the use of a self actuating sealing process, such as, the process of contamination sensitive devices in controlled ambients as well as the containment of hazardous materials.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A single furnace loading cycle method for sintering at least one product comprising the steps of:

placing said at least one product into a ventable/sealable box, placing said box within said furnace, venting said box inside said furnace at furnace temperatures in a first temperature range, and sealing said at least one product inside said box in a second temperature range, wherein said second temperature range is higher than said first temperature range, said box includes a closeable top cover for said box, and a control means, said control means comprises a first set of collapsible spacers which hold open said cover at temperatures below said first temperature range and collapse to lower said cover into sealing engagement with said box at temperatures above said first temperature range, and further comprising a substrate to be sintered within said box, a lower and an upper setter on opposite sides of said substrate, said substrate resting on said lower setter, and a second set of collapsible spacers resting on said lower setter and having heights sufficient to lift said upper setter above the height of said substrate, said second set of spacers collapsing to lower said upper setter to rest upon said substrate at temperatures above said first temperature range.

2. The method of claim 1, wherein said first temperature is in the range of between about 1200° C. to about 1330° C.

3. The method of claim 1, wherein said second temperature is in the range of between about 1400° C. to about 1600° C.

4. The method of claim 1, wherein said at least one product is selected from a group consisting of chip, ceramic substrate or glass ceramic substrate.

5. The method of claim 1, further comprising at least one blind hole in said cover.

6. The method of claim 5, wherein said at least one blind hole acts as a reservoir.

7. The method of claim 5, wherein said at least one blind hole acts as a reservoir for at least one of said first set of collapsible spacers.

8. The method of claim 1, wherein material for said first set of collapsible spacers is selected from a group consisting of Mo, W, $Al_2O_3$, AlN or $ZrO_2$.

9. The method of claim 1, wherein material for said first set of collapsible spacer is selected from a group consisting of ceramic, refractory metal or cermet material.

10. The method of claim 1, wherein said first set of collapsible spacers are selected from a group consisting of materials that are sensitive to the change in ambient oxygen partial pressure.

11. The method of claim 1, wherein the composition of said first set of collapsible spacers have at least one sintering inhibitor.

12. The method of claim 1, further comprising at least one blind hole in said lower setter.

13. The method of claim 12, wherein said at least one blind hole acts as a reservoir.

14. The method of claim 12, wherein said at least one blind hole acts as a reservoir for at least one of said second set of collapsible spacers.

15. The method of claim 1, wherein material for said second set of collapsible spacers is selected from a group consisting of Mo, W, $Al_2O_3$, AlN or $ZrO_2$.

16. The method of claim 1, wherein material for said second set of collapsible spacer is selected from a group consisting of ceramic, refractory metal or cermet material.

17. The method of claim 1, wherein said second set of collapsible spacers are selected from a group consisting of materials that are sensitive to the change in ambient oxygen partial pressure.

18. The method of claim 1, wherein the composition of said second set of collapsible spacers has at least one sintering inhibitor.

* * * * *